US012645010B2

(12) United States Patent
Beinhorn et al.

(10) Patent No.: US 12,645,010 B2
(45) Date of Patent: Jun. 2, 2026

(54) METHOD AND APPARATUS FOR DETECTING SUBCOOLED LIQUID PRECIPITATION

(71) Applicant: Adolf Thies GmbH & Co. KG, Goettingen (DE)

(72) Inventors: Joachim Beinhorn, Niemetal (DE); Christoph Peper, Hannover (DE); Herbert Windolph, Duderstadt (DE)

(73) Assignee: Adolf Thies GmbH & Co. KG, Goettingen (DE)

( * ) Notice: Subject to any disclaimer, the term of this patent is extended or adjusted under 35 U.S.C. 154(b) by 364 days.

(21) Appl. No.: 18/195,406

(22) Filed: May 10, 2023

(65) Prior Publication Data

US 2023/0280496 A1     Sep. 7, 2023

Related U.S. Application Data

(63) Continuation-in-part of application No. PCT/EP2021/080759, filed on Nov. 5, 2021.

(30) Foreign Application Priority Data

Nov. 10, 2020     (EP) .................................... 20206578

(51) Int. Cl.
    *G01W 1/14*        (2006.01)
    *G01W 1/02*        (2006.01)
(52) U.S. Cl.
    CPC ................ *G01W 1/14* (2013.01); *G01W 1/02* (2013.01)

(58) Field of Classification Search
    CPC ................................. G01W 1/02; G01W 1/14
    See application file for complete search history.

(56) References Cited

U.S. PATENT DOCUMENTS

| | | | |
|---|---|---|---|
| 3,164,820 A | 1/1965 | Hulett | |
| 3,422,677 A * | 1/1969 | Lockwood | G01W 1/14 |
| | | | 307/118 |
| 3,782,130 A * | 1/1974 | Irvine | G01W 1/06 |
| | | | 62/140 |
| 10,490,904 B2 | 11/2019 | Bennett | |
| 2010/0116940 A1 | 5/2010 | Picco et al. | |

(Continued)

FOREIGN PATENT DOCUMENTS

| | | | |
|---|---|---|---|
| CN | 210102004 U | 2/2020 | |
| CN | 114019582 A * | 2/2022 | G01W 1/02 |
| DE | 1245615 B | 7/1967 | |

(Continued)

OTHER PUBLICATIONS

Chinese Office Action for Chinese Patent Application No. 202180083925.5 mailed Mar. 18, 2026 (partially translated).

*Primary Examiner* — Jill E Culler
(74) *Attorney, Agent, or Firm* — Thomas | Horstemeyer, LLP

(57) ABSTRACT

In order to detect subcooled liquid precipitation, a temperature of an object having a precipitation impingement surface is measured, and an occurrence of precipitation onto the precipitation impingement surface is determined. The temperature of the object and the occurrence of the precipitation are analyzed, and a subcooled liquid precipitation warning is output, if there is an increase in the temperature of the object below 0° C. because of the occurrence of the precipitation.

20 Claims, 9 Drawing Sheets

(56)     References Cited

U.S. PATENT DOCUMENTS

2021/0349239  A1     11/2021  O'Nagy

FOREIGN PATENT DOCUMENTS

| | | | | | |
|---|---|---|---|---|---|
| DE | 10150320 | A1 | 12/2002 | | |
| EP | 0360892 | A1 | 4/1990 | | |
| EP | 3196676 | A1 | 7/2017 | | |
| GB | 694783 | A * | 7/1953 | .............. | G01W 1/14 |
| KR | 10-1486785 | B1 | 2/2015 | | |
| KR | 101682940 | B1 * | 12/2016 | .......... | G06Q 50/265 |
| KR | 102265311 | B1 * | 6/2021 | .............. | G01W 1/02 |
| KR | 102560968 | B1 * | 7/2023 | ............... | G01J 5/80 |
| WO | 2019121805 | A1 | 6/2019 | | |

* cited by examiner

METHOD AND APPARATUS FOR DETECTING SUBCOOLED LIQUID PRECIPITATION

CROSS REFERENCE TO RELATED APPLICATIONS

This application is a continuation in part (CIP) of International Application PCT/EP2021/080759 with an international filing date of Nov. 5, 2021 and claiming priority to European Patent Application No. EP 20 206 578.5 entitled "Verfahren und Vorrichtung zum Erkennen von unterkühltem flüssigem Niederschlag", filed on Nov. 10, 2020.

FIELD OF THE INVENTION

The present invention generally relates to a method of and an apparatus for detecting subcooled liquid precipitation. More particular the present invention relates to a method of detecting subcooled liquid precipitation in which a temperature of an object having a precipitation impingement surface is measured and in which an occurrence of precipitation onto the precipitation impingement surface is determined. Further, the invention relates to an apparatus for detecting subcooled liquid precipitation comprising an object having a precipitation impingement surface, temperature measurement devices for measuring a temperature of the object, and precipitation determination devices for determining an occurrence of precipitation onto the precipitation impingement.

The most frequent form of subcooled liquid precipitation is subcooled or freezing rain which in English is designated as freezing rain and which has the METAR-code FZRA. As used here, the term subcooled liquid precipitation, besides freezing rain, also covers liquid precipitation of smaller drop size like, for example, freezing drizzle which in English is designated as freezing drizzle and which has the METAR-code FZDZ.

Prior to impinging onto the ground, subcooled liquid precipitation has a temperature below 0° C. Subcooled liquid precipitation, for example, arises when rain falls through a ground-level air layer whose temperature is below 0° C. If the water of the rain drops is very pure, it does not crystalize in the air but cools without phase change down to the air temperature of the surrounding air of below 0° C. Upon impinging onto the ground, subcooled liquid precipitation may freeze very quickly and form close sheets of ice. Thus, subcooled liquid precipitation is dreaded in road and air traffic. Thus, it is important, to detect subcooled liquid precipitation quickly and securely to be able to warn about the dangers associated therewith.

BACKGROUND OF THE INVENTION

Known methods of and apparatuses for detecting subcooled liquid precipitation are based on the detection of icing of an object subjected to the precipitation, from which non-freezing liquid precipitation would run off and to which precipitation already frozen in the air does not attach. In practice, an increase in the effective mass is determined as an indication of the icing of the object in that, for example, a mechanical resonance frequency decreasing with the increasing effective mass, a moment of inertia increasing with increasing effective mass, or directly the increase in the effective mass is determined. Additionally, the air temperature is measured, because subcooled liquid precipitation typically only occurs in a limited range of the air temperature from −10° C. to 0° C.

A method of and an apparatus for detecting subcooled liquid precipitation are known from European patent application publication EP 3 196 676 A1. The apparatus comprises a Yagi-Uda-antenna whose response signal to an exciting signal varies with the precipitation which precipitates onto its surfaces. Further, the temperature is determined by means of a temperature sensor arranged in the area of the Yagi-Uda-antenna. In that the information from the response signal of the Yagi-Uda-antenna is correlated with the course of temperature, it is assumed that instantaneously freezing subcooled liquid precipitation is present instead of liquid precipitation which only freezes on the Yagi-Uda-antenna after a decrease in the air temperature.

There still is a need of a method and an apparatus by which subcooled liquid precipitation is already securely detected based on very small amounts of precipitation and, thus, very early.

SUMMARY OF THE INVENTION

The present invention relates to a method of detecting subcooled liquid precipitation.

The method comprises providing an object having a precipitation impingement surface, measuring a temperature of the object, and determining an occurrence of precipitation onto the precipitation impingement surface. The method further comprises, analyzing the measured temperature of the object and the occurrence of the precipitation, and outputting a subcooled liquid precipitation warning, if there is an increase in the measured temperature of the object below 0° C. because of the occurrence of the precipitation.

The present invention also relates to an apparatus for detecting subcooled liquid precipitation. The apparatus comprises an object having a precipitation impingement surface, temperature measurement devices configured for measuring a temperature of the object, and determination devices configured for determining an occurrence of precipitation onto the precipitation impingement surface. The apparatus further comprises analyzation devices connected to the temperature measurement devices and the determination devices, and configured for analyzing the measured temperature of the object and the occurrence of the precipitation, and outputting a subcooled liquid precipitation warning, if there is an increase in the measured temperature of the object below 0° C. because of the occurrence of the precipitation.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
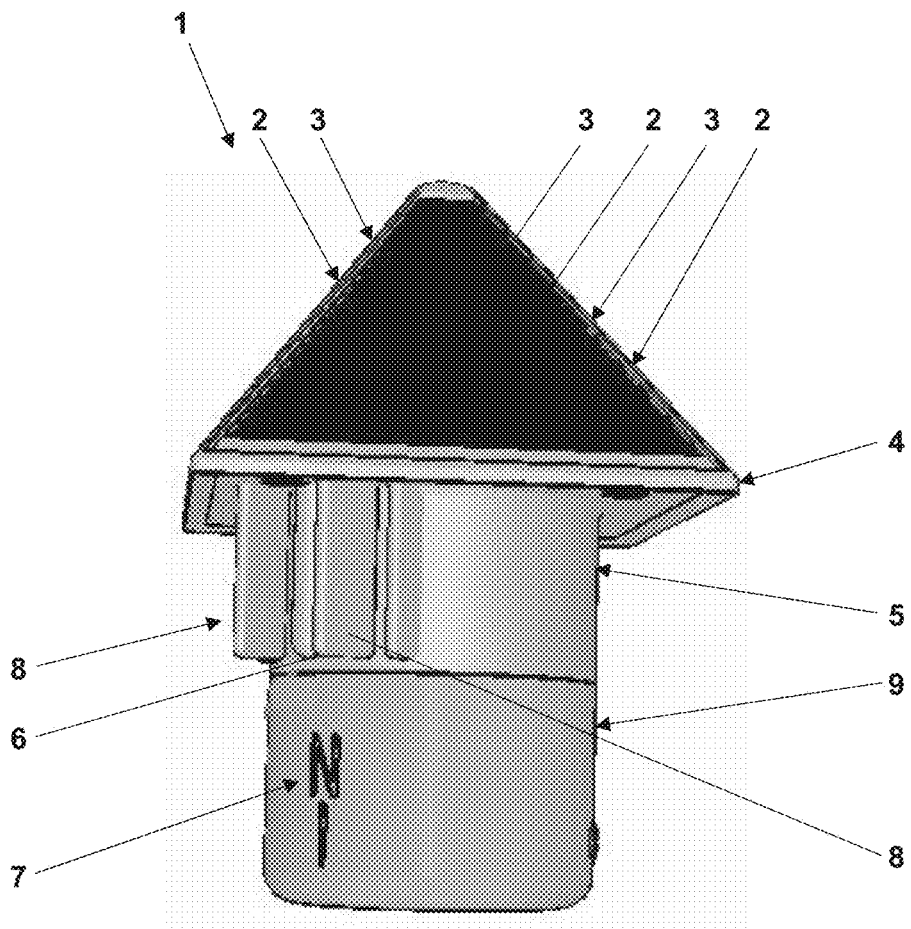
FIG. 1 shows a first embodiment of an apparatus according to the present disclosure for carrying out the method according to the present disclosure.

In the method of detecting subcooled liquid precipitation according to the present disclosure, a temperature of an object having a precipitation impingement surface is measured, and it is determined whether precipitation onto the precipitation impingement surface occurs. In case of an increase in the temperature below 0° C. because of precipitation occurring, a subcooled liquid precipitation warning is output.

The relevant increase in the measured temperature below 0° C. may stop a maximum measured temperature of 0° C. Typically, it will stop at a measured temperature below 0° C. The relevant increase in the temperature below 0° C. does not stop a maximum temperature of above 0° C. In the relevant increase in the measured temperature below 0° C., the entire increase in the temperature takes place below 0° C.

The subcooled liquid precipitation warning is given at a time when the temperature of the object displays an increase below 0° C. because of precipitation occurring. If subcooled liquid precipitation impinges on the precipitation impingement surface of the object and freezes there, heat of crystallization is released. The heat of crystallization of water is nearly 80 times as high as the thermal capacity of water per Kelvin. Upon freezing of subcooled liquid precipitation, this high heat of crystallization is released very quickly, and, thus, a significant increase in the measured temperature of the object already results from a very small amount of subcooled liquid precipitation. In practice, the temperature in the respective freezing drop of the subcooled liquid precipitation and, thus, also the temperature directly at the precipitation impingement surface instantaneously increases to 0° C. and remains there until the entire heat of crystallization of the drop is used up, i.e. dissipated. Due to the thermal capacity of the object, the increase in the temperature of the entire object and thus also of the measured temperature of the object is, in principle, smaller unless very much subcooled liquid precipitation freezes on the precipitation impingement surface. However, even with a very high thermal capacity of the object, a distinct increase in the temperature of the object results at locations close to the precipitation impingement surface because of the finite thermometric conductivity of the object, which can be easily determined in measuring the temperature of the object at these locations and easily evaluated as an indication of subcooled liquid precipitation freezing on the precipitation impingement surface. When this indication is present, the subcooled liquid precipitation warning is output.

At the beginning of the impingement of the subcooled liquid precipitation onto the precipitation impingement surface, the precipitation may remain liquid on the precipitation impingement surface despite being subcooled. This, for example, applies with drizzle, if the falling velocity of the precipitation is too small to initiate the crystallization due to concussion upon impinging onto the precipitation impingement surface, or if the precipitation impingement surface is very clean after a longtime rain so that only few impurities are present as crystallization seeds for the freezing of the subcooled liquid precipitation. Therefore, in an embodiment of the method, an electric capacitance of the object at the precipitation impingement surface is determined in that an oscillating frequency of an RC-oscillator including this electric capacitance is determined. The oscillating frequency linearly depends on the reciprocal value of the electric capacitance. The electric capacitance depends on the material covering the precipitation impingement surface. Without precipitation, this material is air. If the precipitation impingement surface, due to precipitation, is at least partially covered with water, the electric capacitance is strongly increased due to the high relative dielectric constant of water which is 88 at 0° C. If the precipitation impingement surface is partially covered with ice, the electric capacitance is also increased but only to a lesser extent as the relative dielectric constants of ice is only 16 at −20° C. Despite an unknown percentage of the coverage of the precipitation infringement surface with water or ice, this difference in the relative dielectric constants may be used to determine the presence of subcooled liquid precipitation on the precipitation impingement surface in that the precipitation infringement surface is heated up from below 0° C. to above 0° C. If the electric capacitance at the precipitation impingement surface remains constant, although an occurrence of precipitation has previously been determined, this is an indication of subcooled liquid precipitation that did not change its liquid aggregation state at 0° C. On the contrary, an increase of the electric capacitance at the precipitation impingement surface at 0° C. indicates that frozen precipitation having the lower relative dielectric constant melted on the precipitation impingement surface so that the higher relative dielectric constant of water became effective.

In another embodiment of the method, subcooled liquid precipitation which does not freeze on the precipitation impingement surface and which does, thus, not cause the increase of the temperature below 0° C. is detected by measuring the oscillating frequencies of two different RC-oscillators which both include the electric capacity at the precipitation impingement surface but which have different basic oscillation frequencies. The phenomenon utilized here is that the frequency-dependent relative dielectric constant of ice, with increasing frequency, already drops at frequencies below 40 kHz. To the contrary, the relative dielectric constant of water, with increasing frequency, only drops at a frequency of more than 1,000 MHz. Thus, determining the relative dielectric constant of the precipitation at a lower first oscillation frequency and a higher second oscillation frequency below 1,000 MHz results in a huge difference in the relative dielectric constants determined with ice but not with water. No change in the relative dielectric constant measured at different oscillating frequencies indicates water on the precipitation impingent surface, and, in combination with a temperature of the precipitation impingement surface of below 0° C. and particularly of below −2° C. or even −5° C., this is a clear indication of subcooled liquid precipitation. In such a case, a subcooled liquid precipitation warning may be output. Further, a freezing fog (FZFG) warning may be output, if the temperature of the precipitation impingement surface is equal to an air temperature in the surroundings so that the air humidity is 100% and no heat of evaporation is taken from the object at the precipitation impingement surface. With an air humidity below 100%, heat of evaporation will be taken from the object at the precipitation impingement surface, and the precipitation impingement surface will be at a temperature below the air temperature.

The measurement of the relative dielectric constant or the basic relative dielectric capacitance at different oscillating frequencies may be easily implemented by operating one RC-oscillator with different electric resistances in that a series resistor is added or not. More particular, the basic oscillation frequency of the RC-oscillator without precipitation on the precipitation impingement surface may once be adjusted to a frequency below the drop of the relative dielectric constant of ice, like, for example, to about 1 kHz, and once to a frequency above the drop of the relative dielectric constant of ice, like, for example, to about 40 kHz, by means of the additional or another series resistor.

If it is mentioned here and in the claims that it is determined whether precipitation onto the precipitation impingement surface occurs, it is possible, but not necessary, to determine an impingement of the precipitation onto the precipitation impingement surface for this purpose. For example, it is also sufficient to determine whether and particularly how much precipitation is present on the precipitation impingement surface and to deduce from variations noticed therein that there has been precipitation onto the precipitation impingement surface in the meantime.

If it is mentioned here and in the claims that the increase in the temperature below 0° C. occurs because of occurring and, thus, determined precipitation, this does therefore not only enclose the case that the increase in the temperature occurs at least nearly quasi-simultaneously with the occurring precipitation. Instead, the increase in temperature may be delayed with respect to the precipitation occurring, particularly because an onset of the freezing of the precipitation is delayed and may have to be induced at first. In any case, the increase in temperature is correlated with the precipitation occurring to detect subcooled liquid precipitation.

In an embodiment of the method, other and further indications of subcooled liquid precipitation may also be detected and used for upgrading the subcooled liquid precipitation warning with respect to its significance. One such indication is that the increase in the measured temperature of the object, when related to an amount of the precipitation determined, exceeds a predetermined threshold value. Generally, non-subcooled liquid precipitation which has a higher temperature than the object may also result in an increase in the temperature of the object when impinging onto the precipitation impingement surface. As soon as the measured temperature increases to above 0° C., the subcooled liquid precipitation warning has to be downgraded with respect to its significance. However, even if non-subcooled liquid precipitation freezes on the precipitation impingement surface and the same heat of crystallization as in freezing of subcooled liquid precipitation is released, there are determinable differences. The speed at which the subcooled liquid precipitation freezes is much higher than that one at which non-subcooled liquid precipitation freezes. With subcooled liquid precipitation, the freezing starts spontaneously in the entire volume along dendritic structures within the respective drop; with non-subcooled liquid precipitation the freezing at first only starts at the boundary surface to the precipitation impingement surface. Thus, in freezing of subcooled liquid precipitation, always so much heat of crystallization is released that the entire respective drop, up to directly at the precipitation impingement surface, is heated up to 0° C. and kept there until the heat of crystallization is completely dissipated, i.e. given to the object or any other surrounding of the respective drop. With non-subcooled liquid precipitation, the temperature at the precipitation impingement surface increases to 0° C. for a short time at maximum. Together with the boundary layer of the growing ice, the 0° C. isothermal line quickly shifts away from the precipitation impingement surface into the respective drop, and the temperature at the precipitation impingement surface drops to below 0° C. just as quickly. Thus, a higher increase in the measured temperature of the object results with subcooled liquid precipitation during the freezing of the precipitation. When neglecting the thermal capacity of the temperature sensor used, the speed and the height of the increase essentially depend on the relative position of the location of measuring the temperature of the object with respect to the location of freezing of the precipitation on the precipitation impingement surface, and on the course of the temperature at the precipitation impingement surface. An effective thermometric conductivity between the location of the measurement and the location of the freezing with respect to a thermometric conductivity between the location of the measurement and the remaining object and any heat sinks having an effect thereon, like, for example, cold air in the surroundings of the object, are decisive for the relative position. Besides the kind of the precipitation—subcooled or not—, the course of the temperature at the precipitation impingement surface is dependent on the amount of the precipitation. If the increase in the temperature, when related to the amount of the precipitation determined, exceeds a threshold value which is not reached by non-subcooled precipitation, this is a strong indication of the presence of subcooled liquid precipitation and, thus, a basis for upgrading the subcooled liquid precipitation warning with respect to its significance. To achieve a high sensitivity for differentiating subcooled and non-subcooled precipitation, the thermometric conductivity between the location of the measurement and the location of the freezing should be as high as possible as compared to the thermometric conductivity between the location of the measurement and the remaining object and any heat sinks having an effect thereon.

Even if the increase in temperature leads onto a maximum temperature of not more than 0° C., this is a suitable basis for upgrading the subcooled liquid precipitation warning with respect to its significance. Directly there where the subcooled liquid precipitation impinges on the precipitation impingement surface, the heat of crystallization released upon its freezing increases the temperature to a peak or maximum temperature of 0° C. However, in a measurement of the temperature carried out at a distance thereto, a maximum temperature of less than 0° C. appears for the reasons indicated above due to the effective thermometric conductivities. How long the increased temperature is kept by the measured temperature depends on the effective thermal capacity of the object and the amount of subcooled liquid precipitation as well as on the surrounding conditions. These surrounding conditions, for example, include air humidity and wind velocity, which determine the speed of the re-reduction of the temperature. If a re-reduction of the temperature occurs after the increase in temperature up to a maximum temperature of less than 0° C. because of the occurring precipitation, this may, thus, be taken as an indication of subcooled liquid precipitation which justifies an upgrading of the warning with respect to its significance.

It has already been mentioned that a subcooled liquid precipitation occurs in a typical range of the air temperature. Thus, an air temperature in the surroundings of the object may be measured and the subcooled liquid precipitation warning may be upgraded with respect to its significance in case of a measured air temperature in a range from –20° C. to –2° C. and particularly in a range from –10° C. to –5° C.

Besides the temporal course of the increase and also of a subsequent re-dropping of the measured temperature, a spatial course of the measured temperature along the precipitation impingement surface, i.e. in the plane of the precipitation impingement surface may be determined in an embodiment of the method. It is to be understood that, for this purpose, the temperature has to be measured at different points of the object which are preferably distributed along the precipitation impingement surface. Then, the subcooled liquid precipitation warning may be upgraded with respect to its significance in case of an increase in the measured temperature of the object which begins locally and which fades along the precipitation impingement surface with time. The spatial fading of the increase in the measured temperature along the precipitation impingement surface is an indication of the local input of heat of crystallization at the location of the impingement or freezing of the precipitation on the precipitation impingement surface.

In an embodiment of the method, the object may be heated up at a defined power after determining the increase in temperature below 0° C. because of occurring precipitation. If then a plateau of a resulting further increase in the measured temperature of the object occurs at 0° C., this is an evidence that ice melts on the precipitation impingement surface and that the heat of crystallization previously transferred to the object has to be returned to the precipitation as melting heat before the temperature of the precipitation impingement surface can increase to above 0° C. This is an indication of subcooled liquid precipitation which justifies upgrading the warning with respect to its significance.

In an embodiment of the method, a reference object having a further precipitation impingement surface is kept at a further temperature above the air temperature in the surroundings of the object and of the reference object, and it is determined, whether precipitation onto the further precipitation impingement surface occurs. The further precipitation impingement surface at the further temperature above the air temperature is protected against bedewing such that dew or frost, i.e. condensed water vapor and particularly hoarfrost, i.e. re-sublimated water vapor may not precipitate thereon. If it is then determined that precipitation onto the precipitation impingement surface of the unheated object occurs, but no precipitation onto the further precipitation impingement surface occurs, the precipitation is dew, frost or hoarfrost. If, at the same time, the increase in temperature below 0° C. is observed because of the occurring precipitation onto the object, the precipitation is hoarfrost. Correspondingly, a hoarfrost warning is then output in this embodiment of the method.

In an embodiment of the method, the object may be further heated up to above 0° C. and it may be determined whether this results in an increase in at least one of an electric capacitance and an electric conductivity of the object at the precipitation impingement surface. If the increase results, it may be deduced that snow or ice have been on the precipitation impingement surface. With the melting of snow or ice on the heated-up precipitation impingement surface, the dielectric constant is increased such that the electric capacitance of the object at the precipitation impingement surface is increased. The electric conductivity of the object at the precipitation impingement surface is also increased.

In an embodiment of the method, the occurrence of precipitation onto the precipitation impingement surface may be determined in different ways. This includes a continuous determination of the mass of the object including the precipitation impingement surface. However, in an embodiment of the method, the precipitation onto the precipitation impingement surface may be determined in that it is determined whether at least one of an electric capacitance and an electric conductivity of the object at the precipitation impingement surface varies over the time. Corresponding measurement arrangements for determining precipitation are generally known. Based on the height of the variation of the at least one of the electric capacitance and the electric conductivity of the object at the precipitation impingement surface, it is possible to deduce the part of the precipitation impingement surface covered by the precipitation determined and thus an amount of the precipitation determined. Here, it shows that subcooled liquid precipitation which freezes on the precipitation impingement surface results into an electric capacitance or electric conductivity which steadily changes with the amount of the precipitation and which remains constant without further precipitation. To the contrary, particularly precipitation flowing over the precipitation impingement surface, i.e. water flowing over the precipitation impingement surface, results in a variation of these values. This difference may also be used as a basis for upgrading the subcooled liquid precipitation warning with respect to its significance.

In an embodiment of the method, the electric capacitance of the object at the precipitation impingement surface is both evaluated for variations over the time and with increasing frequency to determine both the occurrence of precipitation and whether the precipitation is water or ice.

In an embodiment of the method, the determination whether precipitation onto the precipitation impingement surface occurs may also be made indirectly in that it is determined whether the temperature of the object changes stepwise. Such a stepwise change indicates a heat output or a heat input due to individual drops of the precipitation, particularly an input of heat of crystallization due to freezing individual subcooled liquid drops of the precipitation. To the contrary, convection heat and convection cold and evaporation cold result in a steady change of the temperature of the object at the precipitation impingement surface. At least with subcooled liquid precipitation, due to the comparatively high heat of crystallization, it is possible to also deduce an amount of the precipitation occurring onto the precipitation impingement surface from a size of a stepwise change in the temperature of the object.

An apparatus according to the present disclosure for detecting subcooled liquid precipitation comprises an object having a precipitation impingement surface, temperature measurement devices for measuring a temperature of the object, precipitation determination devices for determining whether precipitation onto the precipitation impingement surface occurs, and evaluation devices which are configured for detecting an increase in the temperature below 0° C. because of occurring precipitation and for carrying out the method according to the present disclosure.

In an embodiment of the apparatus, the apparatus comprises an RC-oscillator including an electric capacitance at the precipitation impingement surface and a variable electric resistance. The variable electric resistance of the RC-oscillator allows for adjusting the RC-oscillator with no precipitation present on the precipitation impingement surface to a first basic oscillation frequency of about 1 kHz and to a second basic oscillation frequency of about 40 kHz or above. Switching the RC-oscillator between these basic oscillating frequencies allows for determining whether the electric capacitance at the precipitation impingement surface varies or not. A variation of the electric capacitance indicates a variation of the frequency dependent relative dielectric constant and, thus, the presence of ice on the precipitation impingement surface. No variation of the electric capacitance indicates no variation of the frequency dependent relative dielectric constant and, thus, the presence of water on the precipitation impingement surface. In the latter case and with a temperature of the precipitation impingement surface below 0° C. the subcooled liquid precipitation warning will be output, even without an increase of the temperature below 0° C. A freezing fog (FZFG) warning may be output, if the temperature of the precipitation impingement surface is equal to an air temperature in this surroundings so that the air humidity is 100% and the low heat of evaporation is taking from the precipitation impingement surface. The temperature measurement devices of an embodiment of the apparatus are configured for locally measuring the temperature of the object close to the precipitation impingement surface. For this purpose, the temperature measurement devices may comprise an array of temperature sensors extending along the precipitation impingement surface. In practice, these temperature sensors may be arranged at a lower side of the two-dimensional object facing away from the precipitation impingement surface.

The temperature measurement devices may additionally be configured for measuring an air temperature in the surroundings of the object. For this purpose, the temperature measurement devices preferably comprise an air temperature sensor protected against precipitation. In contrast to the temperature sensors which sense the temperature of the object, the temperature sensor is then not influenced by a heat input or a heat output due to precipitation.

In an embodiment, the apparatus may further comprise heating devices to heat the object at a defined power, particularly after a detected increase in the temperature below 0° C. because of occurring precipitation. As already explained, a course of the measured temperature resulting from this input of heat allows for deducing whether the precipitation impingement surface is iced, because, then, a considerable input of heat is used up by the melting heat at 0° C. Further, the deicing and melting of snow on the sensor surface allows for regaining the measurability of the sensor.

Alternatively or additionally, the apparatus may have heating devices for heating a reference object at a defined power. This reference object may completely correspond to the object having the precipitation impingement surface. In any case, the reference object has a further precipitation impingement surface; and further temperature measurement devices which are configured for measuring a temperature of the reference object, and further precipitation determination devices which are configured for determining whether precipitation onto the further precipitation impingement surface occurs are connected to the evaluation devices. As it has been explained above with reference to the method according to the present disclosure, with the aid of such a reference object, dew, frost and hoarfrost may be detected and it may be differentiated between dew and frost on the one hand and hoarfrost on the other hand.

In an embodiment of the apparatus, the precipitation impingement surface is typically oriented at an inclination angle with regard to the horizontal, which allows for adherence of precipitation but avoids that greater amounts of liquid precipitation stay on the precipitation impingement surface. Generally, the inclination angle may be in a range between 10° and 80°. Preferably it is between 50° and 70°, i.e. about 60° with respect to the horizontal.

The precipitation determination devices of the apparatus may be configured for determining at least one of an electric capacitance and an electric conductivity of the object at the precipitation impingement surface. Generally, the precipitation determination devices may, as already mentioned, also be configured for determining a mass of the object comprising the precipitation impingement devices in order to deduce an amount of the precipitation on the precipitation impingement surface therefrom. The determination of the amount of the precipitation by means of the at least one of the electric capacitance and the electric conductivity of the object at the precipitation impingement surface additionally allows for conclusions on the distribution of the precipitation over the precipitation impingement surface, at least if the at least one of the electric capacitance and the electric conductivity is determined at a distinct resolution along the precipitation impingement surface. The electric capacitance may particularly be determined in that the oscillating frequency of an RC-oscillator including this capacitance is determined, which linearly depends on the reciprocal value of the electric capacitance.

Referring now in greater detail to the drawings, the apparatus 1 which is depicted in FIG. 1 in a slightly perspective side view serves for determining meteorological data particularly with respect to precipitation which impinges onto a precipitation impingement surface 2 of the apparatus 1. At its top side, the apparatus comprises a pyramidal arrangement of a total of four precipitation impingement surfaces 2. The inclination of each of the precipitation impingement surfaces 2 with respect to the horizontal is 60°. Thus, precipitation may adhere thereto. However, bigger amounts of liquid precipitation run off the precipitation impingement surfaces 2 in downward direction. The precipitation impingement surfaces 2 are the outer surfaces of sensor circuit boards 3 which are arranged in the openings of a rigid frame 4 and supported at the rigid frame 4 in the opening. The rigid frame 4 connects to a top of a housing 5 of the apparatus, in which evaluation devices are located and at the outside of which an air temperature sensor 6 is arranged. Due to the frame 4 with the sensor circuit boards 3 arranged therein, the air temperature sensor 6 is protected against precipitation in upward direction. The air temperature sensor 6 is protected against solar irradiation in that, in operation of the apparatus 1, the air temperature sensor 6 is oriented in a northward direction, see a cardinal direction indicator 7 on the apparatus 1. Further, the air temperature sensor 6, in circumferential direction around the housing 5, is arranged between wings 8, in order to protect it against wind and blown-on precipitation. In downward direction, the housing 5 connects to a connection area 9 of the apparatus comprising mechanical and electric connections not depicted here in detail.

Figure 2:
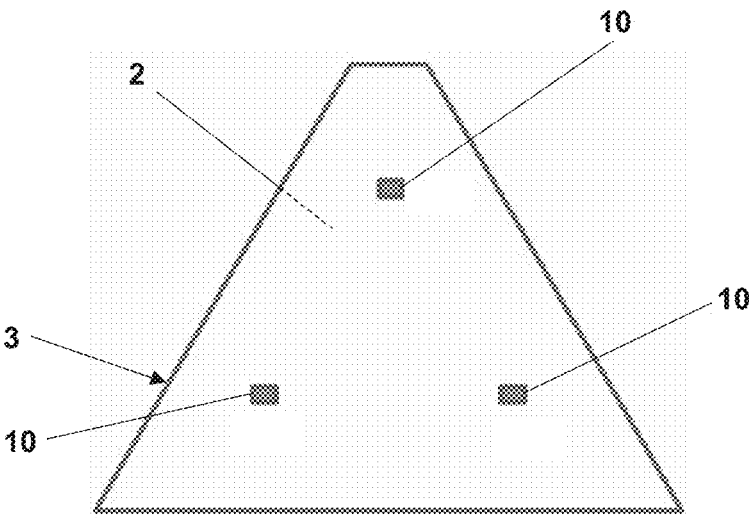
FIG. 2 is a back view of a sensor circuit board of the apparatus according to FIG. 1.

The back view of one of the sensor circuit boards 3 according to FIG. 1 depicted in FIG. 2 reveals an arrangement of, here, three temperature sensors 10 distributed over the precipitation impingement surface 2. By means of the temperature sensors 10, the temperature of the sensor circuit board 3—as the object comprising the precipitation impingement surface 2—is determined locally. Additionally, a coverage of the precipitation impingement surface 2 with precipitation and thus the occurrence of precipitation onto the precipitation impingement surface 2 is detected by means of precipitation determination devices not depicted here.

Figure 3:
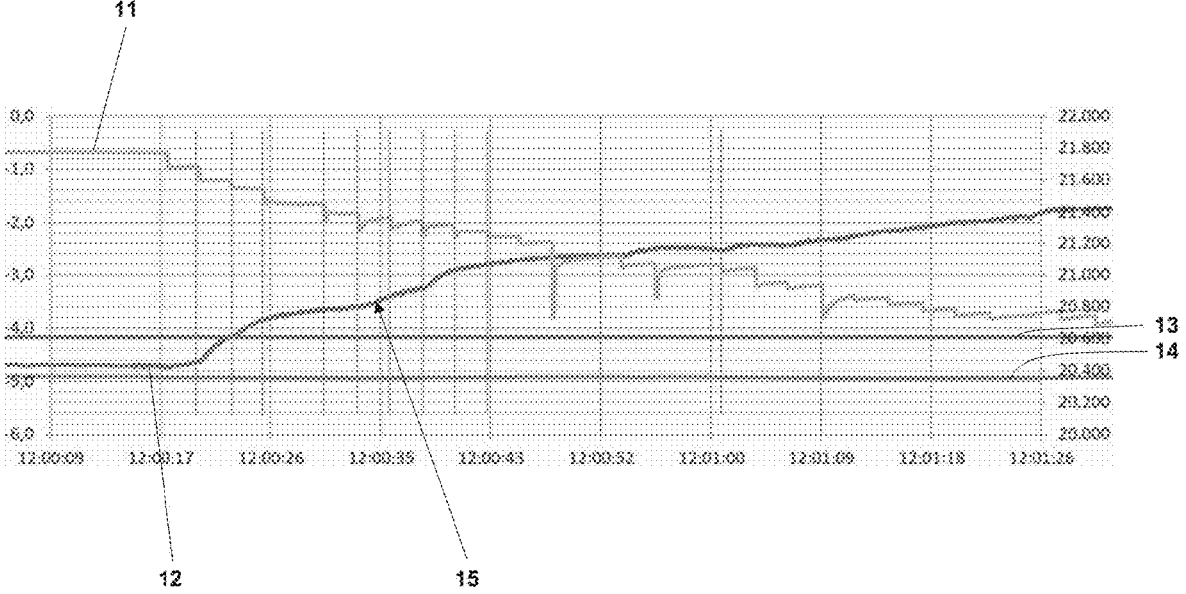
FIG. 3 is a plot of different measurement values which are determined by the apparatus according to FIG. 1 when subcooled liquid rain hits onto its sensor circuit board and freezes there.

In FIG. 3, the courses of different values are plotted for a period of time of about 30 seconds in which a total of 12 drops of subcooled liquid water impinged onto the sensors circuit board 3 oriented at an angle of 60° with respect to the horizontal in an area of the precipitation impingement surface 2 opposite to the upper one of the temperature sensors depicted in FIG. 2. Here, the point in time of the impingement of each of the 12 drops is indicated by a dashed vertical line. The line running at the top of FIG. 3 shows the course of the oscillation frequency 11 of an RC-oscillator which includes an electric capacitance formed at the precipitation impingement surface 2. Due to the coverage of the precipitation impingement surface 2 with the occurring precipitation, this electric capacitance increases and, correspondingly, the oscillation frequency 11 of the electric RC-oscillator decreases. An increasing line in FIG. 3 shows the course of the temperature 12 of the sensor circuit board 3 which was measured with the upper one of the three temperature sensors 10 according to FIG. 2. A horizontal line indicates a water temperature of the subcooled liquid water prior to the impingement onto the precipitation impingement surface 2; and a further horizontal line 14 indicates the air temperature in the surroundings of the sensor circuit board 3 as it was determined with the air temperature 6 in the apparatus 1 according to FIG. 1. As indicated by the stepwise decreasing oscillation frequency 11, the coverage of the precipitation impingement surface 2 increases with the impingement of each of the 12 drops onto the precipitation impingement surface 2. practically, the increasing coverage is a coverage with ice to which the subcooled liquid water freezes on the precipitation impingement surface 2. This freezing releases crystallization heat which results in an increase in the temperature 12 of the sensor circuit board 3 in the area of the impingement of the respective drop. Correspondingly, the line 21 increases after the freezing of each of the 12 drops impinging on the precipitation impingement surface 2. This increase 15 occurs at temperatures below 0° C. and approaches 0° C. as that temperature to which the drops heat up in freezing due to the heat of crystallization released therein. The increase 15 below 0° C. which quickly follows to the impingement of the drop onto the precipitation impingement surface 2 indicated by the decreasing oscillation frequency 11 is a clear indication of the presence of subcooled liquid precipitation so that the evaluation devices of the apparatus 1 output a corresponding warning signal.

Generally, the oscillation frequency 11 decreases stepwise with the impingement of each of the 12 drops. However, directly after the impingement of individual ones of the 12 drops, the oscillation frequency 11 at first stronger decreases before it stabilizes at a level above this initial decrease. This may be attributed to the fact that the part of the precipitation impingement surface 2 covered by the respective drop directly after its impingement is somewhat larger, before the respective drop still prior to freezing slightly contracts on the rather hydrophobic precipitation impingement surface.

FIG. 3 clearly shows that the heat of crystallization released at the precipitation impingement surface 2 by the freezing of each of the 12 drops is sufficient to results in a resolvable increase in the temperature at the backside of the sensor circuit board 3 which can be determined with one of the temperature sensors 10 according to FIG. 2, despite the thermal capacity of the sensor circuit board 3. It is to be understood that the thermal capacity of the sensor circuit board is to be limited in order to observe this effect. However, no special measures are necessary, i.e. no particularly low thermal capacity of the sensor circuit board.

Figure 4:
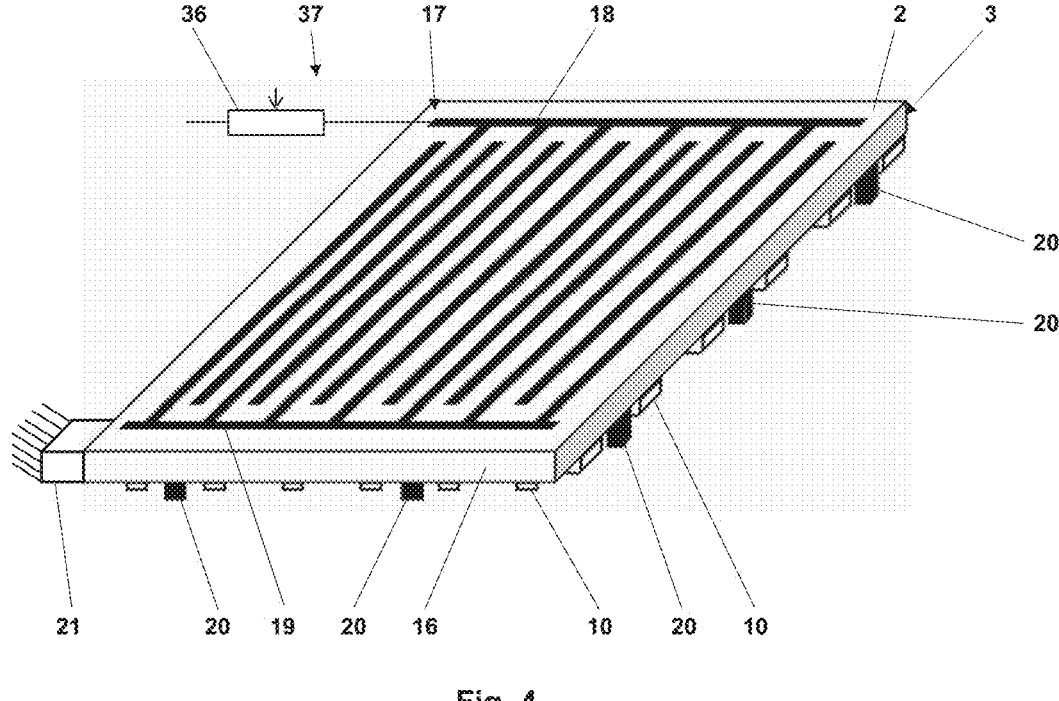
FIG. 4 is a perspective view of a sensor circuit board of another embodiment of the apparatus according to the present disclosure.

FIG. 4 shows a sensor circuit board 3 of another embodiment of the apparatus. This sensor circuit board 3 has another, i.e. no triangular but a rectangular geometric basic shape but generally implements the same measurement principles as the sensor circuit board according to FIGS. 1 and 2. Practically, the sensor circuit board 3 according to FIG. 4 is based on a substrate 16 made of aluminum oxide, and having a typical thickness in a range of 0.2 to 1 mm and a glass passivation of its surfaces of a thickness of typically 5 to 15 μm. Under the glass passivation of the precipitation impingement surface 2, a sensor arrangement 17 is formed with two comb-shaped electrodes 18 and 19 meshing along the precipitation impingement surface 2 while keeping a distance to one another. The electric capacitance between the electrodes 18 and 19 made of, for example, a silver palladium alloy, which is influenced by a coverage of the precipitation impingement surface 2 with water resulting from precipitation, defines the oscillation frequency of an RC-oscillator 36 of the precipitation determination devices. The RC-oscillator 36 has a variable electric resistance which is illustrated by a potentiometer 37 to allow for adjusting different basic oscillating frequencies of the RC-oscillator without precipitation on the precipitation impingement surface 2. Except of its RC-member the RC-oscillator is not depicted here. At the underside of the substrate 16, temperature sensors 10 and heating elements 20 are arranged. The heating elements 20 are parts of heating devices by which the sensor circuit board 3 can be heated up at a defined power. If a temperature plateau at 0° C. occurs in heating up the sensor circuit board 3 from below 0° C., this is an indication that the precipitation impingement surface 2 is covered with ice and that the ice only melts when the necessary melting heat has been supplied. The necessary melting heat is as high as the heat of crystallization released in freezing. By means of the heating elements 20, one of several sensor circuit boards 3 may further be heated up to a temperature slightly, i.e. by a few Kelvin, above the air temperature and kept there as a reference object. Thus, this sensor circuit board 3 is provided with a bedewing protection, and if precipitation occurs only onto another sensor circuit board 3 not heated up above the air temperature by means of the heating elements 20, it may be concluded on the occurrence of dew or frost. Hoarfrost is present if, with the precipitation only onto the sensor circuit board 3 not heated up with the heating elements 20, the increase 15 in temperature below 0° C. nevertheless results. The temperature sensors 10 are arranged at the backside of the substrate 16 in a two-dimensional pattern. Thus, a temperature sensor 10 is present in the vicinity of each point of the precipitation impingement surface 2. Thus, each drop of subcooled liquid water impinging onto the precipitation impingement surface 2, which freezes on the precipitation impingement surface 2, results in a local increase in temperature of the substrate 16 which, at least at the location of one of the temperature sensors 10, is so high that it can be securely determined. The distribution of the increase in temperature over the surface of the substrate 16, whose exact course depends on the thermal capacity and the thermometric conductivity of the substrate 16, is an indication that a drop of subcooled liquid precipitation impinged on to the precipitation impingement surface 2 and froze there.

An optional actuator 21 may be provided which, here, engages a lateral edge of the substrate 16, and which may be used for exciting the sensor circuit board 3 for mechanical natural oscillations. An eigenfrequency of these mechanical natural oscillations is defined by an elasticity and an elastic bearing of the sensor circuit board 3, and by a total mass of the sensor circuit board 3 and of any precipitation adhering thereto. Thus, determining the eigenfrequency and variations thereof allows for determining the occurrence and the amount of the precipitation onto the precipitation impingement surface 2. The actuator 21 may be made as a micro electro mechanic system (MEMS).

Figure 5:
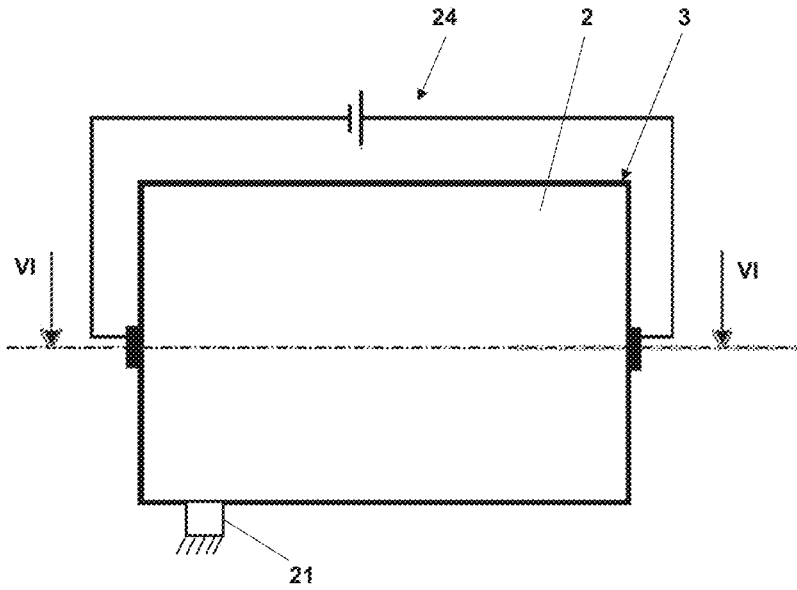
FIG. 5 is a schematic top view of a sensor circuit board of a further embodiment of the apparatus according to the present disclosure.
Figure 6:
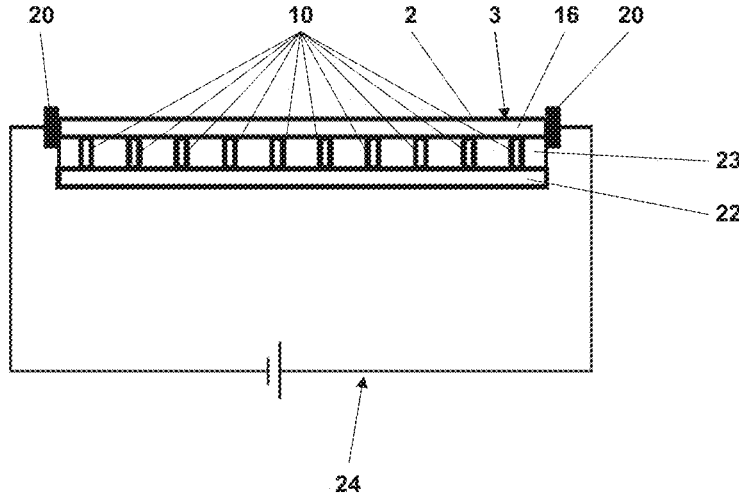
FIG. 6 is a section through the sensor circuit board according to FIG. 5 along a section line VI-VI depicted in FIG. 5.

In the embodiment of the sensor circuit board 3 according to FIGS. 5 and 6, the substrate 16 is made of a thermometrically conductive and sufficiently weather resistant or surface passivated metal of a typical material sickness from 10 μm to 1 mm. At the underside of the substrate 16, an array of temperature sensors 10 is arranged on a common circuit board 22. Gaps between the temperature sensors 10 may be filled with insulating material 23. The heating elements 20 of a heating device 24 are, here, arranged at opposite lateral edges of the substrate 16. The optional actuator 21 may once again engage one of these lateral edges of the substrate 16.

Figure 7:
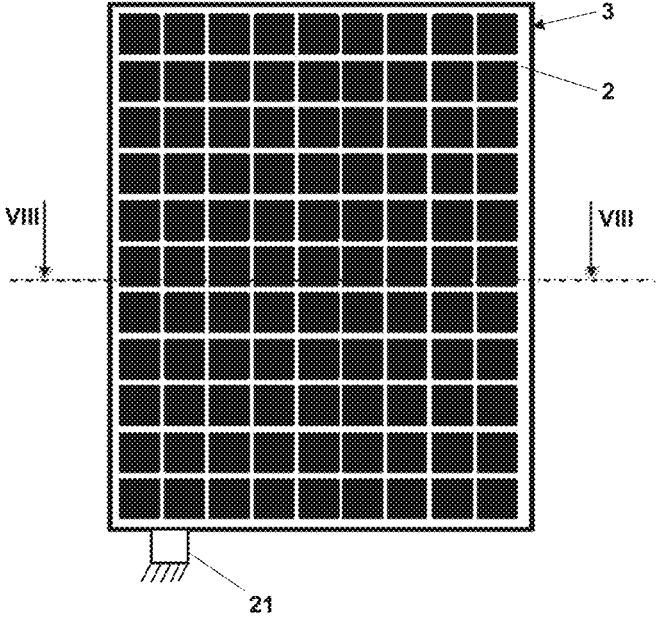
FIG. 7 is a schematic top view of yet another sensor circuit board of a further embodiment of the apparatus according to the present disclosure.
Figure 8:
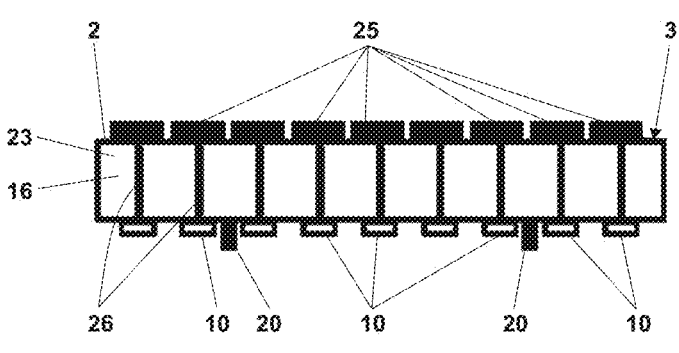
FIG. 8 is a section through the sensor circuit board according to FIG. 7 along a section line VIII-VIII depicted in FIG. 7.

In the embodiment of the sensor circuit board 3 according to FIGS. 7 and 8, the substrate 16 is made of an insulating material 23. Highly thermometrically conductive contact pads 25 are arranged on the precipitation impingement surface 2 and connected to the temperature sensors 10 arranged at the underside of the substrate 16 via highly thermometrically conductive connections 26. In this way, the thermal capacity of the sensor circuit board 3, which dampens the determinable increase in temperature, is reduced to the thermal capacity of an individual contact pad 25, an individual connection 26 and an individual temperature sensor 20, if a drop of subcooled precipitation impinges onto one of the contact pads 25 and freezes there.

Figure 9:
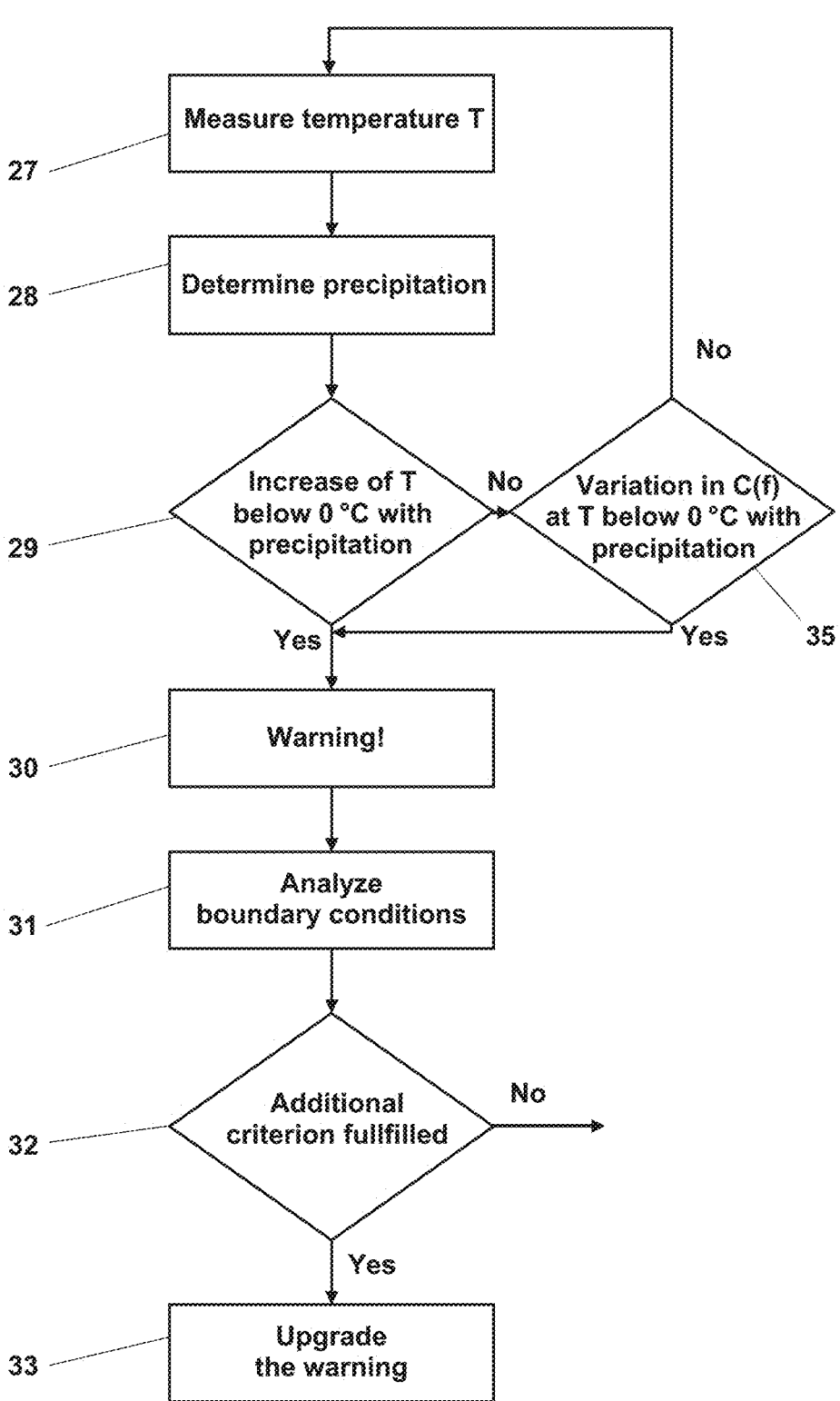
FIG. 9 is a flow chart of an embodiment of the method according to the present disclosure.

The embodiment of method according to the present disclosure depicted in FIG. 9 as a flow chart starts with measuring the temperature T of the respective sensor circuit board 3 including the precipitation impingement surface 2 in a step 27, and the determination of precipitation occurring on the precipitation impingement surface 2 in a step 28. If, in an examination 29, an increase in the measured temperature T below 0° C. is temporally related to the determination of precipitation, a subcooled liquid precipitation warning is output in a step 30. Additionally, an analysis of the boundary conditions under which the increase in the measured temperature T below 0° C. is made in a step 31. If it is determined in an examination 32 that additional criterions are fulfilled so that further indications of the presents of subcooled liquid precipitation are present, the subcooled liquid precipitation warning is upgraded with respect to its significance in a step 33. It has already been explained when such criterions are fulfilled. These criterions include that the increase in the measured temperature only began with an excited movement of the precipitation impingement surface; that the increase in the measured temperature, when related to an amount of the precipitation determined, exceeded a predetermined threshold value; that the increase in the measured temperature leads to a peak or maximum temperature of not more than 0° C.; that a measured air temperature in the surroundings of the objects were in a range from −20° C. to −2° C. or more particular in a range from −10° C. to −5° C.; that the increase in the measured temperature of the sensor circuit board began locally and faded away along the precipitation impingement surface; that a heating up of the sensor circuit board, after the increase in the measured temperature below 0° C., resulted in a further increase in the measured temperature of the sensor circuit board which had a temperature plateau at 0° C., and that at least one of an electric capacitance and an electric conductivity at the precipitation impingement surface, during the increase in the measured temperature, changed steadily or remained constant during the increase in the measured temperature. In examining whether the last criterion is fulfilled, short time effects of the electric capacitance and the electric conductivity at the precipitation impingement surface are to be neglected, which are conditioned by a re-contraction of drops of liquid precipitation on a hydrophobic precipitation impingement surface or by a still proceeding spreading of liquid precipitation on a hydrophilic precipitation impingement surface. However, in a practical embodiment of the method according to the present disclosure, it may only be examined whether a selection of these criterions is fulfilled. The further criterions may be neglected.

If no increase in the temperature T below 0° C. is present in the examination 29, an additional examination 35 may be executed to determine whether, at the temperature T below 0° C., an electric capacitance C at the precipitation impingement surface 2 varies depending on the oscillation frequency f of the RC-oscillator 36 including this electric capacitance and a variable electric resistance for varying its basic oscillating frequency without precipitation on the precipitation impingement surface 2. If there is no change in the electric capacitance despite precipitation present on the precipitation impingement surface 2, this also indicates subcooled liquid precipitation on the precipitation impingement surface 2, and the warning 30 is also output.

Many variations and modifications may be made to the preferred embodiments of the invention without departing substantially from the spirit and principles of the invention. All such modifications and variations are intended to be included herein within the scope of the present invention, as defined by the following claims.

What is claimed:

1. A method of detecting subcooled liquid precipitation, the method comprising providing an object having a precipitation impingement surface, measuring a first temperature of the object at a first time, the first temperature of the object being below 0° C., determining an occurrence of precipitation onto the precipitation impingement surface, measuring a second temperature of the object at a second time following the occurrence of the precipitation, analyzing the first temperature of the object, and the second temperature of the object to determine whether the second temperature is both greater than the first temperature and not greater than 0° C., and in response to determining that the second temperature is both greater than the first temperature and not greater than 0° C., outputting a subcooled liquid precipitation warning.

2. The method of claim 1, further comprising, after the occurrence of the precipitation, taking measurements of an electric capacitance of the object at the precipitation impingement surface at a first oscillating frequency of an RC-oscillator coupled to the precipitation impingement surface, the RC-oscillator including the electric capacitance of the object at the precipitation impingement surface, the first basic oscillating frequency being not more than 2 kHz, and at a second oscillating frequency of the RC-oscillator of at least 20 kHz;

determining, based on the measurements, whether the electric capacitance of the object at the precipitation impingement surface at the second oscillating frequency is smaller than the electric capacitance of the object at the precipitation impingement surface at the first oscillating frequency, and in response to determining that the electric capacitance of the object at the precipitation impingement surface at the second oscillating frequency is not smaller than the electric capacitance of the object at the precipitation impingement surface at the first oscillating frequency and the second temperature of the object is below 0° C., outputting the subcooled liquid precipitation warning.

3. The method of claim 1, further comprising:

making repeated determinations as to an occurrence of precipitation onto the precipitation impingement surface to determine an amount of precipitation;

determining, based on the first temperature, the second temperature, and the amount of precipitation, whether an increase from the first temperature to the second temperature, that is both greater than the first temperature and not greater than 0° C., exceeds a threshold value related to the amount of precipitation;

in response to determining that the increase from the first temperature to the second temperature exceeds the threshold value, modifying the subcooled liquid precipitation warning with respect to its significance.

4. The method of claim 1, further comprising, determining that the second temperature is both greater than the first temperature and below 0° C., and in response to determining that the second temperature is both greater than the first temperature and below 0° C., modifying the subcooled liquid precipitation warning with respect to its significance.

5. The method of claim 1, further comprising measuring an air temperature in surroundings of the object, and, modifying the subcooled liquid precipitation warning with respect to its significance in response to measuring the air temperature to be in a range from −20° C. to −2° C.

6. The method of claim 1, further comprising determining a respective measured temperature of the object at each different point in a set of different points on the object, the set of different points being distributed across the precipitation impingement surface;

determining a spatial course of the measured temperature along the precipitation impingement surface based on the respective measured temperature of the object at each different point in the set of different points, determining, based on the spatial course of the measured temperature along the precipitation impingement surface, whether an increase in the measured temperature along the precipitation impingement surface begins at a particular point in the set of different points and fades away along the precipitation impingement surface over time, and in response to determining that the increase in the measured temperature along the precipitation impingement surface begins at the particular point in the set of different points and fades away along the precipitation impingement surface over time, modifying the subcooled liquid precipitation warning with respect to its significance, if the increase in the measured temperature of the object below 0° C. starts locally and fades away along the precipitation impingement surface.

7. The method of claim 1, further comprising, following determining that the second temperature is both greater than the first temperature and not greater than 0°, heating-up the object at a defined power, determining whether there is a plateau of a resulting further increase in the measured temperature of the object at 0° C. from the heating-up of the object at the defined power, and, modifying the subcooled liquid precipitation warning with respect to its significance in response to determining that there is a plateau of a resulting further increase in the measured temperature of the object at 0° C. from the heating-up of the object at the defined power.

8. The method of claim 1, further comprising providing a reference object having a further precipitation impingement surface, keeping the reference object at a further temperature above an air temperature in surroundings of the object and the reference object, determining an occurrence of precipitation onto the further precipitation impingement surface, and outputting a hoarfrost warning, in response to determining that the second temperature is both greater than the first temperature and not greater than 0°, wherein the object is not heated up, and if, at the same time, no occurrence of the precipitation onto the further precipitation impingement surface of the reference object is determined.

9. The method of claim 1, further comprising heating-up the object to above 0° C., determining whether an increase in at least one of an electric capacitance and an electric conductivity of the object at the precipitation impingement surface results, and at least one of upgrading the subcooled liquid precipitation warning with respect to its significance and outputting that snow or ice was present on the precipitation impingement surface, if the resulting increase in at least one of the electric capacitance and the electric conductivity of the object at the precipitation impingement surface is determined.

10. An apparatus for detecting subcooled liquid precipitation, the apparatus comprising an object having a precipitation impingement surface, temperature measurement devices configured for measuring a temperature of the object, determination devices configured for determining an occurrence of precipitation onto the precipitation impingement surface, and analyzation devices connected to the temperature measurement devices and the determination devices and configured for analyzing the measured temperature of the object and the occurrence of the precipitation to determine whether the measured temperature of the object has increased from an initial temperature of below 0° C. to an increased temperature not greater than 0° C. following the occur precipitation, and outputting a subcooled liquid precipitation warning, in response to determining the measured temperature of the object has increased from an initial temperature of below 0° C. to an increased temperature not greater than 0° C. following the occurrence of precipitation.

11. The apparatus of claim 10, further comprising an RC-oscillator coupled to the precipitation impinge-ment surface, the RC-oscillator including an electric capacitance of the object at the precipitation impinge-ment surface and a variable electric resistance, which allows for adjusting different oscillating frequencies of the RC-oscillator.

12. The apparatus of claim 11, wherein the variable electric resistance is configured for adjusting a first basic oscillating frequency of the RC-oscillator without precipi-tation on the precipitation impingement surface of not more than 2 kHz, and a second basic oscillating frequency of the RC-oscillator without precipitation on the precipitation impingement surface of at least 20 kHz.

13. The apparatus of claim 11, wherein the variable electric resistance is configured for adjusting a first basic oscillating frequency of the RC-oscillator without precipi-tation on the precipitation impingement surface of not more than 1 kHz, and a second basic oscillating frequency of the RC-oscillator without precipitation on the precipitation impingement surface of at least 40 kHz.

14. The apparatus of claim 10, wherein the temperature measuring devices are configured for locally measuring the temperature of the object close to the precipitation impinge-ment surface.

15. The apparatus of claim 10, wherein the temperature measurement devices include an array of temperature sen-sors extending along the precipitation impingement surface, wherein the object is a two-dimensional object, and wherein the temperature sensors are arranged at a lower side of the two-dimensional object opposite to the precipitation impingement surface.

16. The apparatus of claim 10, wherein the temperature measurement devices comprise an air temperature sensor configured for measuring an air temperature in surroundings of the object.

17. The apparatus of claim 10, further comprising a heating device configured for heating up the object at a defined power.

18. The apparatus of claim 10, further comprising a reference object having a further precipitation impinge-ment surface, a heating device configured for heating up the reference object at a defined power, further temperature measurement devices configured for measuring a temperature of the reference object, and further precipitation determination devices configured for determining an occurrence of precipitation onto the further precipitation impingement surface, wherein the further temperature measurement devices and the further determination devices are connected to the analyzation devices.

19. The apparatus of claim 10, wherein the precipitation impingement surface is arranged at an inclination angle in a range between 50° and 70° with respect to the horizontal.

20. The apparatus of claim 10, wherein the precipitation determination devices are configured for determining at least one of an electric capacitance and an electric conductance of the object at the precipitation impingement surface.

* * * * *